(12) United States Patent
Morales et al.

(10) Patent No.: US 7,684,086 B2
(45) Date of Patent: Mar. 23, 2010

(54) BLEED CREATION FOR DOCUMENTS

(75) Inventors: Javier A. Morales, Rochester, NY (US);
Michael E. Farrell, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 985 days.

(21) Appl. No.: 11/363,666

(22) Filed: Feb. 28, 2006

(65) Prior Publication Data
US 2007/0201098 A1    Aug. 30, 2007

(51) Int. Cl.
*G06F 3/12* (2006.01)
(52) U.S. Cl. ................... 358/3.26; 358/1.9; 358/1.13
(58) Field of Classification Search ............ 358/1.9, 358/1.13, 3.26, 3.27, 401, 448; 382/254, 382/256
See application file for complete search history.

(56) References Cited

U.S. PATENT DOCUMENTS 6,414,755 B1 * 7/2002 Bronstein et al. .......... 358/1.15
6,549,298 B1 * 4/2003 Sieber et al. ............... 358/1.18

OTHER PUBLICATIONS

RAD Graphics Systems, Free Software Category List (note listed Prep Shop: Auto Bleed) 2004; http://usedimagesetters.com/tips/content/detail_display.asp?value=3.
The Plugin Site Forum; Prep Shop Auto Bleed disc. thread; Jan. 2004; http://graphicsgalaxy.com/forums/thepluginsite/viewtopic.php?p=2511&sid=355fec15f95aa7b1da63457dbb09e.

* cited by examiner

*Primary Examiner*—Thomas D Lee
(74) *Attorney, Agent, or Firm*—Miele Law Group PC

(57) ABSTRACT

Apparatus are provided, including a document application and a bleed creation mechanism. The bleed creation mechanism includes an image extender to automatically determine non-blank extended image information based on a location of a blank perimeter area of a page description language (PDL) file. The image extender further populates the blank perimeter area with the non-blank extended image information.

20 Claims, 4 Drawing Sheets

BLEED CREATION FOR DOCUMENTS

FIELD OF THE DISCLOSURE

The present disclosure relates to bleed creation for documents.

BACKGROUND

Some printed media sheets (sometimes referred to herein as "edge-to-edge printed media sheets") contain content that extends up to one or more edges of the sheet. For example, an image, a pattern, and/or text on a printed surface of a given rectangular sheet may extend, without distortion or interruption, up to all four edges of the given sheet. In other words, these printed media sheets which may be professional documents such as color documents, may contain image content that runs to the edge of a sheet of paper, and visually "bleeds" off the page.

Printing devices typically have problems printing to the edge of the paper. Printing devices may exhibit image defects near sheet edges, including paper curling near the sheet edge. Edge-to-edge printed media sheets are produced with such printing devices despite their limitations in printing near the sheet edges. This is done by printing oversized documents, which are then trimmed to the intended final dimensions.

Before printing an oversized document, a document designer typically designs the document's content virtually—e.g., using software to create a file describing the sheet to be printed and the image content in relation to the sheet. For example, an oversized page may be designed containing an image area that is slightly oversized (e.g., in some instances $\frac{1}{8}^{th}$ of an inch beyond each edge of the desired (target) edge-to-edge printed media sheet), and trim marks may be added to indicate the intended edges of the target sheet. Page layout programs exist for this purpose, and include QuarkXpress and Adobe InDesign. These programs have features that allow for the creation of pages with bleeds.

A problem may arise when a document designer creates one or more virtual pages with image content that runs to the edge of the paper, but does not provide a slightly oversized bleed image or the associated trimming marks. This can occur, for example, if the document was designed with a composition tool that does not support bleeds, or if an existing hardcopy document is being reproduced. Print producers faced with this problem frequently compensate for the lack of bleed image by scaling up the page content to achieve a slightly oversized image. This solution may present problems, for example, when the page content has information near the edges of the paper which will be lost upon trimming, or if the page has size-sensitive information such as logos or graphic elements whose size needs to be maintained constant.

SUMMARY

The present disclosure includes improvements to document applications and document processing applications to include a bleed creation component. In accordance with one embodiment, apparatus are provided. A document application is provided. In addition, a bleed correction mechanism is provided. The bleed correction mechanism includes an image extender to automatically determine non-blank extended image information based on a location of a blank perimeter area of a core image in a page description language (PDL) file. The image extender further populates the blank perimeter area with the non-blank extended image information.

BRIEF SUMMARY OF THE DRAWINGS

Embodiments of the disclosure are further described in the detailed description which follows, by reference to the noted drawings, in which like reference numerals represent similar parts throughout the several views of the drawings, and wherein.

DETAILED DESCRIPTION

Figure 1:
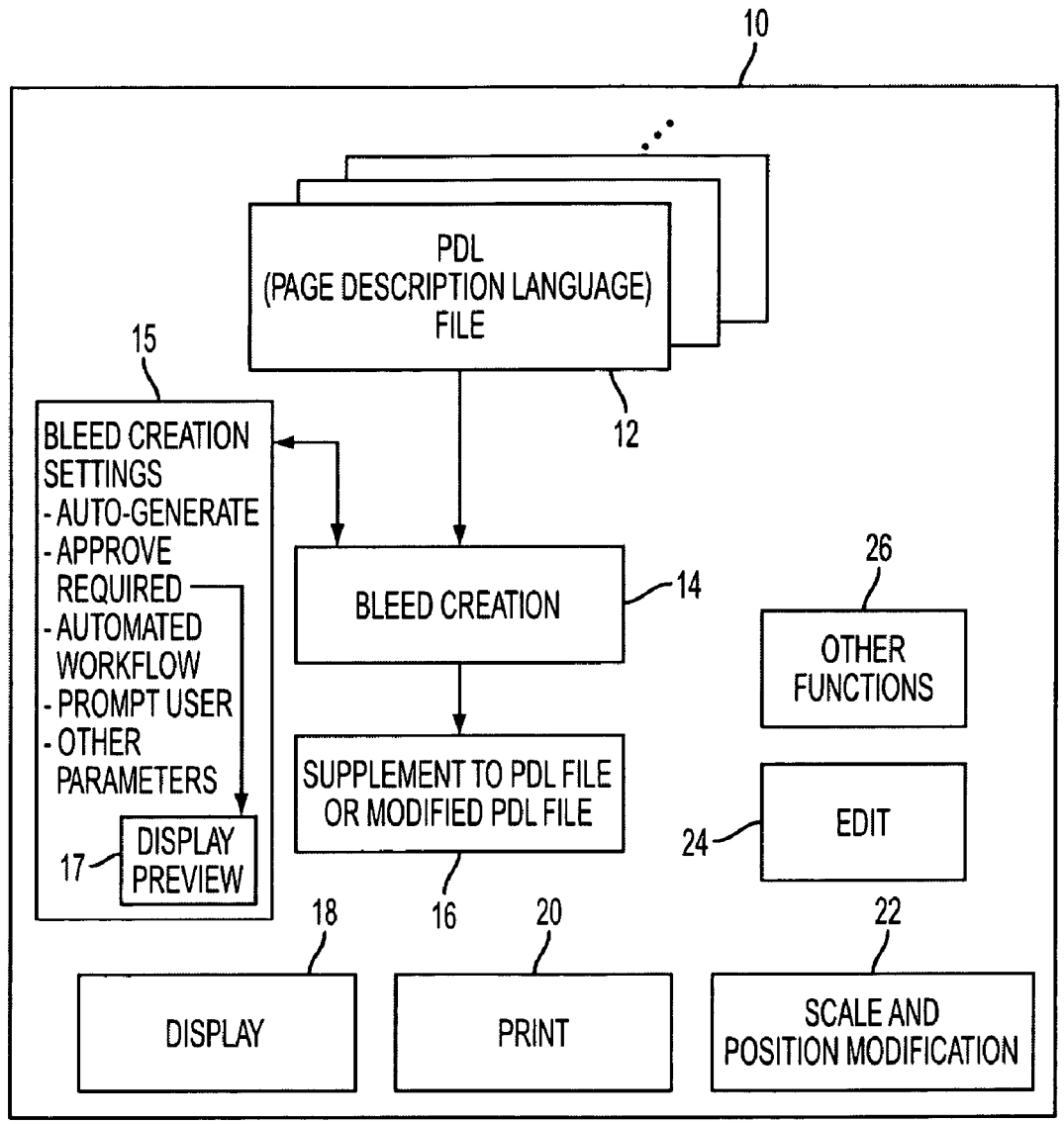
FIG. 1 illustrates a block diagram of an application for document printing, modification, and/or management, in accordance with one embodiment of the disclosure.

Referring now to the drawings in greater detail, FIG. 1 illustrates an application for document printing, modification, and/or management (e.g., a word processing or media publishing application). The illustrated application includes apparatus, for example, a system or subsystem. The application may be implemented with the use of a general purpose computer running software, or with a special purpose computer or apparatus.

The illustrated application 10 includes a set of page description language (PDL) files 12, a bleed creation mechanism 14, and one or more PDL file supplements or modified PDL files 16. The illustrated application further includes bleed creation settings 15, and a display preview mechanism 17. The illustrated application further includes, among other elements not specifically shown, a display 18, a print mechanism 20, a scale and position modification mechanism 22, an edit mechanism 24, and one or more other document management functions 26.

In embodiments herein, a page description language (PDL) may, e.g., be any language used to describe page content, for example, including PDF, PS, EPS (encapsulated PS), TIFF, VIPP (Variable printing language), VPS (variable printing language), PPML (XML-based variable printing language), XPS (XML paper spec used in Windows Vista), HTML, etc.

The bleed creation mechanism 14 includes an image extender to populate a perimeter area of a core image in a given PDL file 12. The perimeter area includes at least a portion which was blank, and which, upon being extended, is now populated with non-blank extended image information. The extended image information may be pixel information or vector information (e.g., where the image is represented by a set of geometric rendering primitives, e.g., points, lines, and triangles), depending on the type of image file being processed. This non-blank extended image information, which may be provided in the form of a PDL file supplement or a modification to the PDL file 16, may be determined automatically based on the location of the perimeter area (e.g., per one embodiment, in accordance with the process shown in FIG. 4 and described below).

The bleed creation mechanism 14 creates bleed information in accordance with bleed creation settings 15. In accordance with bleed creation settings 15, the bleed creation mechanism 14 may automatically determine if a page in a document needs bleed printing, or may determine if a page in a document needs bleed printing in accordance with whether a user specifically indicates such a need, for example, via a computer interface. The bleed creation mechanism 14 may automatically generate a bleed by modifying or supplementing a given PDL file 12, to enlarge the page size and to fill in missing information in the extended perimeter area. This may be done by reflecting existing document content along each edge of the page image. This auto generation feature may be performed, in accordance with the bleed creation settings 15. For example, the bleed creation mechanism 14 may be set up so that it creates a bleed for a given document only when requested by the user, or automatically upon receiving a document of a certain type. In addition, the application 10 may be provided with a feature for requiring approval of the bleed for a given document. This may be part of the bleed creation settings 15. In this regard, in order to allow a given user to approve the bleed for a given document, a display preview 17 may be provided, to allow the user to view the resulting enlarged image with the filled information in the perimeter of that image.

When automatically generating bleed for a given document, the application 10 may prompt the user for certain information needed in order to carry out the bleed generation. For example, the user may be prompted for the desired bleed amount, and the rest of the bleed generation process may be carried out automatically.

In addition, the bleed creation mechanism 14 may function as part of an automated work flow process, as part of a web-based job submission, for example, when a system might detect if a bleed is required. For example, a web-based job submission system may be provided in which a job ticket is specified by a document requester. Certain PDL information may be provided by the requester that identifies a document for which bleed is to be created. The resulting bleed-supplemented document may be displayed for preview by the requester via an online web-based job submission client computer. Should an automated work flow or web-based job submission system be provided, for example, a web server may be provided for interfacing online clients with the application 10.

Other parameters may also be specified as part of the bleed creation settings 15, which are not specifically discussed herein.

Display 18 of application 10 may include, for example, portions of the document printing, modification, and/or management software that direct how document information is displayed by a computer for viewing by a user. In addition, display 18 may include the lower level display software and/or hardware which presents images, patterns, and text to the user as part of a user interface.

Print mechanism 20 may include portions of application 10 which control how an image is to be printed. In addition, or in the alternative, print mechanism 20 may include a print driver, and/or other lower level software and/or hardware components of a computer for interfacing with a print device. Scale and position modification mechanism 22 includes those portions of the application 10 which allow a user to perform scaling and position modification functions on a given image or PDL file. Edit mechanism 24 similarly includes those portions of such an application for allowing various types of editing to be performed on a given file. Other functions 26 may be provided in connection with or as part of application 10.

Figure 2:
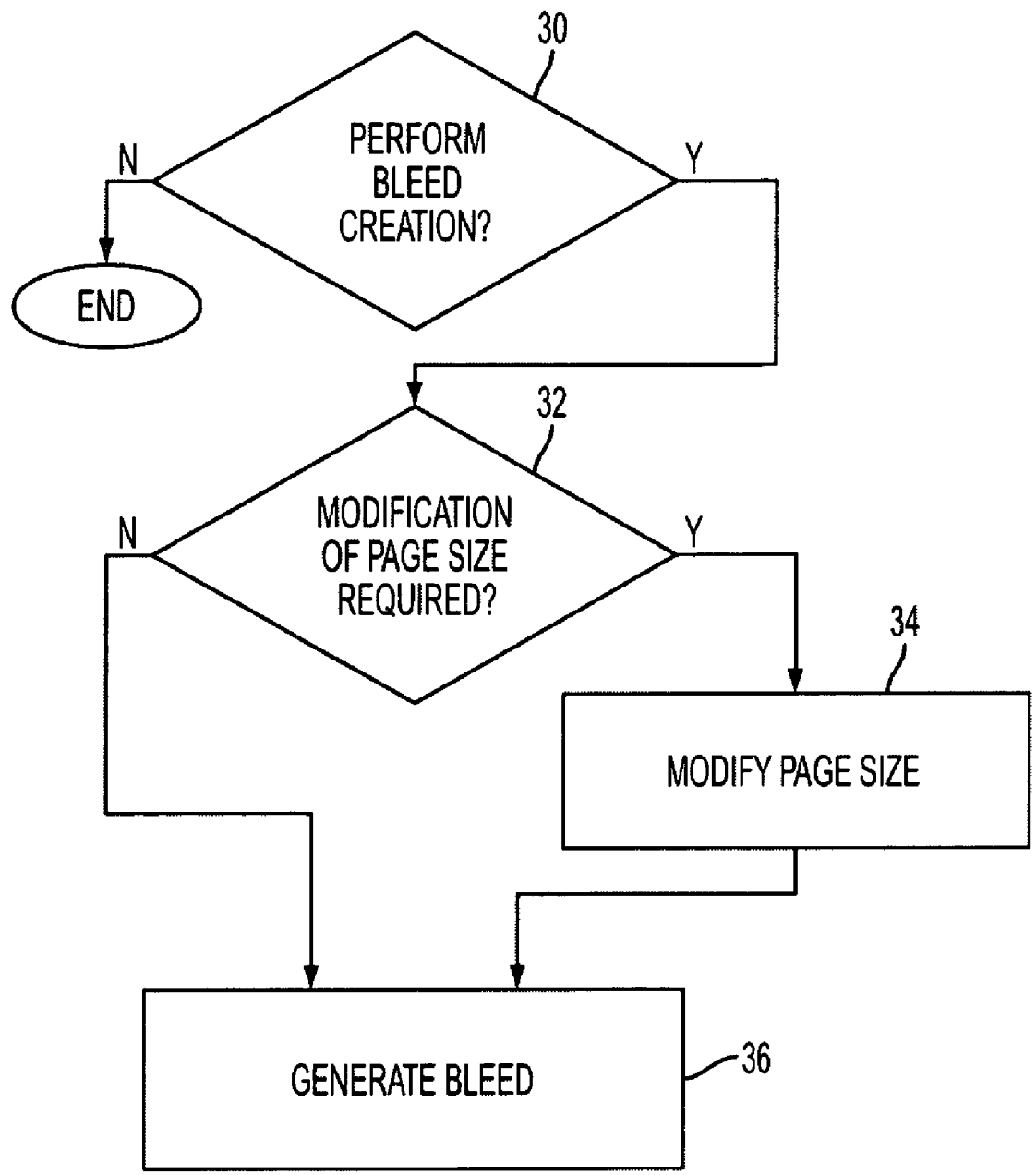
FIG. 2 is a flow chart of a process for bleed creation.

FIG. 2 is a flow chart of a bleed creation process. In the illustrated process, in a first act 30, a determination is made as to whether bleed creation is to be performed. As noted above, bleed creation may be performed automatically. If a bleed creation is not to be performed, the process ends. If a bleed creation is to be performed, the process proceeds from act 30 to act 32, where a determination is made as to whether a modification of the page size (as represented in the PDL file representing the page and its image content) is required. If the modification of the page size is required, the process proceeds to act 34, where the page size is modified. If not, the process proceeds to act 36. Upon reaching act 36, the process will generate a bleed for the given document. When the page size is modified, in the illustrated embodiment, the application modifies, in the given PDL file, a page size setting for the image to provide a perimeter area, at least a portion of which was blank, which will be populated with non-blank extended image pixel information upon the generation of the bleed information at act 36.

Figure 3:
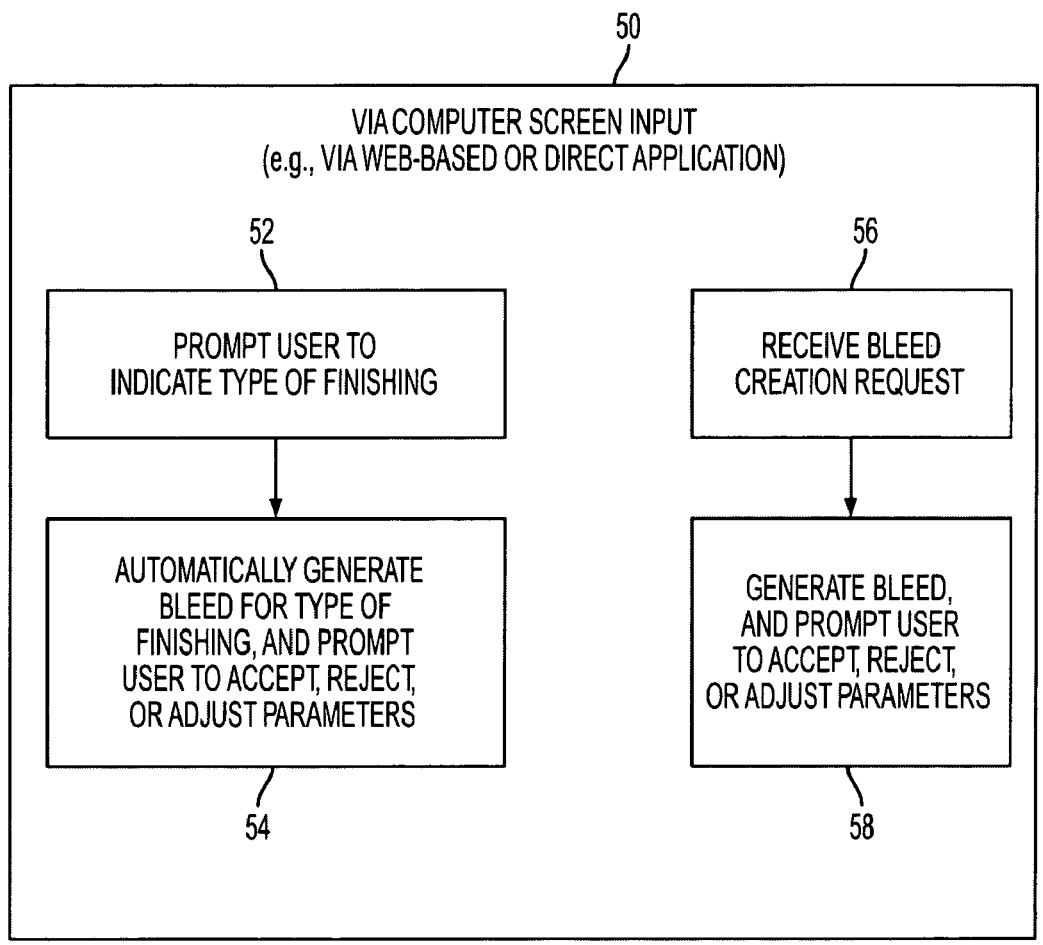
FIG. 3 is a schematic block diagram representation of a computer screen input process.

FIG. 3 is a schematic block diagram of a computer screen input process 50. In accordance with the illustrated process 50, information is input via a computer screen, for example, via a web-based or a direct application. In act 52, a user may be prompted to indicate a type of finishing, whereby finishing parameters are received via at least one computer. In the illustrated embodiment, the finishing parameters are received via a computer screen interface. Thereafter, in act 54, bleed information will be automatically generated for the type of finishing, and a user may be prompted to accept, reject, or adjust the parameters. This may be performed by a bleed control mechanism to automatically adjust the image extender in accordance with the finishing parameters. In accordance with another process for inputting information, in an act 56, a bleed creation request may be received by a user via a computer screen input. Thereafter, in act 58, the bleed may be generated, and the user may be prompted to accept, reject, or adjust the parameters controlling how the bleed will be created.

A bleed preview mechanism may be provided to cause a computer screen display of an image with the perimeter area populated with non-blank information, to allow the user to view the resulting bleed-generated image.

Figure 4:
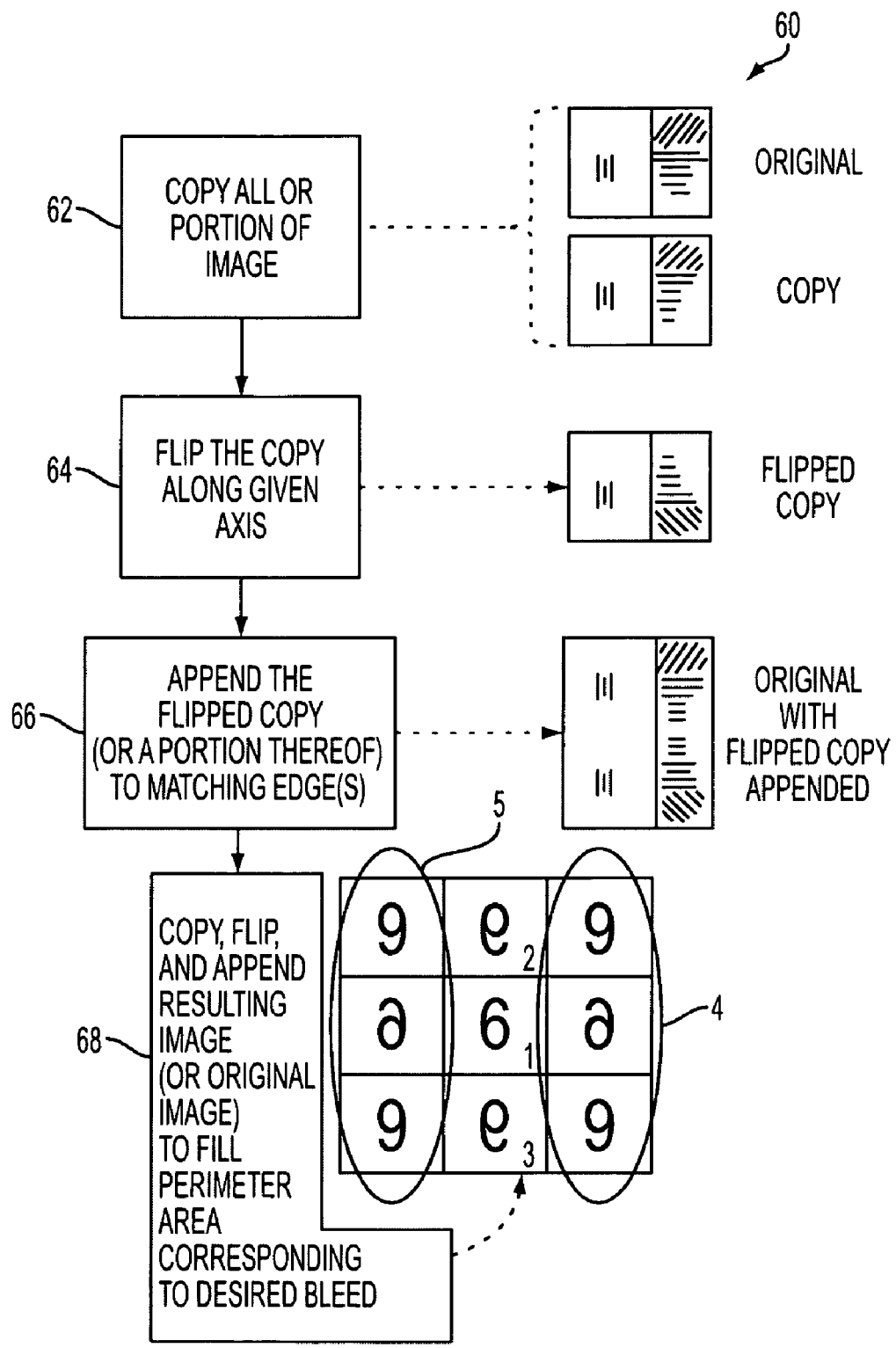
FIG. 4 is a diagram illustrating a bleed generation process in more detail, in accordance with one illustrated embodiment.

FIG. 4 is a diagram illustrating a bleed generation process in more detail, in accordance with one illustrated embodiment. In the first act 62, all or a portion of a core image in a PDL file may be copied by a core image copier to produce a copy of at least a portion of the core image and an extended image generator to generate the extended image information based on the copy. The extended image information may be equal to at least a portion of the copy, or it may be equal to at least a portion of a flipped version of the copy. As shown in FIG. 4, a portion of the image is copied at act 62, and at act 64, the copy is flipped along a given axis. At act 66, the flipped copy is appended to the original core image. Alternatively, a portion of the flipped copy may be appended to the core image, to portions of the core image that have matching edges. Finally, as shown in FIG. 4, in act 68, the portions of the core image are copied, flipped, and appended to the core image to fill the complete perimeter area corresponding to the desired bleed. In the illustrated process shown in FIG. 4, the original core image starts in the form of the number 6. The first copied, flipped, and appended image looks like an inverted version of the letter 6, and is represented by the number 2. The next copied, flipped, and appended image also looks like an inverted 6, and is represented with the number 3. The combined image including blocks 1, 2, and 3, with block 2 above block 1 and block 3 below block 1, is then copied, flipped, and appended, to the image and is referred to as portion number 4. Similarly, the same combined blocks 2, 1, and 3 are copied, flipped and appended to the left of the image, resulting in the appended portion number 5.

The original, copied, and flipped copies of the image are depicted as a pattern in the upper 3 portions corresponding to acts 62, 64, and 66, while the portions of the image, for simplification in explaining the same, are described with respect to a number 6 corresponding to act 68. This difference in the appearance of the image is only to simplify the illustration and explanation of the process in the lower portion of FIG. 4. To be consistent with the type of image for which bleed is being generated in the example in FIG. 4, the resulting image/corresponding to act 68 should appear similar to the images above corresponding to each of acts 62, 64, and 66.

The processing or functions performed by the elements described above may be performed by a general purpose computer and/or by a specialized processing computer. Such processing or functions may be performed by a single platform or by a distributed processing platform. In addition, such processing or functions can be implemented in the form of special purpose hardware or in the form of software run by a computer. Any data handled in such processing or created as a result of such processing can be stored in any type of memory. By way of example, such data may be stored in a temporary memory, such as in the RAM of a given computer. In addition, or in the alternative, such data may be stored in longer-term storage devices, for example, magnetic disks, rewritable optical disks, and so on. For the disclosure herein, machine readable media may, e.g., comprise. any form of data storage mechanism, including the above-noted different memory technologies as well as hardware or circuit representations of such structures and of such data.

The claims as originally presented, and as they may be amended, encompass variations, alternatives, modifications, improvements, equivalents and substantial equivalents of the embodiments and teachings disclosed herein, including those that are presently unforeseen or unappreciated, and that, for example, may arise from applicants/patentees and others.

What is claimed is:

1. Apparatus comprising:
    a computer-readable media-stored document application interoperable with a computer to cause document application processes to be performed whereby document files are modified, the document files including a given page description language (PDL) file which is a given bleed-independent PDL file without any bleed data before being operated upon by a bleed creation mechanism;
    the bleed creation mechanism, the bleed creation mechanism including an image extender configured to automatically determine, from the given bleed-independent PDL file, non-blank extended image information based on a location of a yet-to-be-provided blank perimeter area intended to surround an image in the given bleed-independent PDL file, and configured to create and populate the blank perimeter area with the non-blank extended image information; and
    a page size modifier configured to automatically provide and decide the location of the blank perimeter area of the core image in the given PDL file to thereby create a bleed-dependent PDL file, by automatically modifying, in the given PDL file, a page size setting for the image to provide the blank perimeter area.

2. The apparatus according to claim 1, further comprising a finishing parameter input to receive finishing parameters via at least one computer.

3. The apparatus according to claim 2, further comprising a bleed control mechanism to automatically cause the image extender to populate the perimeter in accordance with the finishing parameters.

4. The apparatus according to claim 2, wherein the finishing parameter input includes a computer screen finishing parameter input.

5. The apparatus according to claim 4, wherein the finishing parameter input includes a finishing parameter input prompting mechanism to prompt a user to provide finishing parameters via at least one computer screen interface.

6. The apparatus according to claim 1, further comprising a bleed parameter input to receive bleed parameters via at least one computer interface.

7. The apparatus according to claim 6, wherein the at least one computer interface includes at least one computer screen interface, and wherein the bleed parameter input includes a computer screen bleed parameter input.

8. The apparatus according to claim 1, further comprising a bleed preview mechanism to cause a computer screen display of the image with the perimeter area populated with the non-blank information.

9. The apparatus according to claim 1, further comprising a finishing parameter input to receive finishing parameters via at least one computer screen interface, a bleed parameter input to receive bleed parameters via at least one computer screen interface, and a web interface input to receive via a web-based computer screen interface the finishing parameters and the bleed parameters.

10. The apparatus according to claim 1, further comprising a finishing parameter input to receive finishing parameters via at least one computer screen interface, a bleed parameter input to receive bleed parameters via at least one computer screen interface, and a direct platform input to receive, via a computer screen local to the bleed creation mechanism, the bleed parameters input via the bleed parameter input.

11. The apparatus according to claim 1, wherein the image extender further includes a core image copier to produce a copy of at least a portion of the core image and an extended image generator to generate the extended image information based on the copy.

12. The apparatus according to claim 11, wherein the extended image information is equal to at least a portion of the copy.

13. The apparatus according to claim 11, wherein the extended image information is equal to at least a portion of a flipped version of the copy.

14. The apparatus according to claim 11, wherein the extended image includes several sides collectively surrounding the core image, and wherein the extended image generator includes a flipper to flip the copy about a given axis parallel to a given side of the several sides and includes an appender to append the copy, flipped about the given axis, to the core image near the given side thereby populating the extended image along the given side.

15. A method comprising:
    modifying a document via a computer based subsystem whereby document files are modified, the document files including a given page description language (PDL) file which is a given bleed-independent PDL file without any bleed data before being operated upon during a bleed creation;
    the bleed creation including a computer automatically determining, from the given bleed-independent PDL file, non-blank extended image information based on a location of a yet-to-be-provided blank perimeter area intended to surround an image in the given bleed-independent PDL file, and including a computer creating and populating the blank perimeter area in the PDL file with the non-blank extended image information; and
    automatically providing and deciding the location of the blank perimeter area of the core image in the given PDL file to thereby create a bleed-dependent PDL file, by automatically modifying, in the given PDL file, a page size setting for the image to provide the blank perimeter area.

16. The method according to claim 15, wherein the determining further includes copying at least a portion of the core image and generating the extended image information based on the copy.

17. The method according to claim 16, wherein the extended image information includes at least a portion of the copy.

18. The method according to claim 17, wherein the extended image information includes at least a portion of a flipped version of the copy.

19. Computer-readable media including encoded data interoperable with a computer to cause:

processing and modifying of a document via a computer based application whereby document files are modified, the document files including a given page description language (PDL) file which is a given bleed-independent PDL file without any bleed data before being operated upon during a bleed creation; and the bleed creation including a computer automatically determining, from the given bleed-independent PDL file, non-blank extended image information based on a location of a yet-to-be-provided blank perimeter area intended to surround an image in the given bleed-independent PDL file, and including a computer creating and populating the blank perimeter area in the PDL file with the non-blank extended image information; and automatically providing and deciding the location of the blank perimeter area of the core image in the given PDL file to thereby create a bleed-dependent PDL file, by automatically modifying, in the given PDL file, a page size setting for the image to provide the blank perimeter area.

20. The Computer-readable media of claim 19, including encoded data interoperable to further cause:

copying at least a portion of the core image and generating the extended image information based on the copy.

* * * * *